April 26, 1960 W. R. AYRES ET AL 2,934,272

MESSAGE COMPARATOR

Filed Nov. 27, 1953 4 Sheets-Sheet 1

INVENTORS
WILLIAM R. AYRES &
JOEL N. SMITH
BY Morris A. Rabkin
ATTORNEY

INVENTORS
WILLIAM R. AYRES &
JOEL N. SMITH
BY Morris L. Rabin
ATTORNEY

INVENTORS
WILLIAM R. AYRES &
JOEL N. SMITH
BY Morris Rabkin
ATTORNEY

INVENTORS
WILLIAM R. AYRES &
JOEL N. SMITH
BY Morris A. Rabkin
ATTORNEY

United States Patent Office 2,934,272

Patented Apr. 26, 1960

2,934,272

MESSAGE COMPARATOR

William R. Ayres, Oaklyn, and Joel N. Smith, Westmont, N.J., assignors to Radio Corporation of America, a corporation of Delaware Application November 27, 1953, Serial No. 394,693

24 Claims. (Cl. 235—177)

This invention relates to information handling systems, and particularly to a system for determining the order of precedence of digitally encoded messages.

Modern information handling systems include a great variety of complex computing machines capable of performing intricate logical processes. These machines store and recall information, sort it into desired patterns, and calculate with or otherwise manipulate the information so retained. Many of these computers presently utilize electronic structures because of the speed and flexibility of electronic components and circuits. They also employ digital representations of quantities because of the precision achievable through digital computations, and because of the flexibility of digital representation.

Digital computing systems often employ a binary system in which succeeding digits represent progressively higher powers of 2. With this binary system, which is well known in the computer art, the only digits used are 1 and 0. These two digits may be represented by alternative states or conditions, which in electronic computers are usually the alternative states of conduction and nonconduction of an electron tube or a conductor. This type of representation may form the basis for the storage and manipulation of intelligence.

To provide an integrated system for handling all types of information, computers often employ this binary notation to represent not only decimal digits less than 10, but multiple decimal digit numbers, alphabetical characters, and special informative symbols. This representation is accomplished in one commonly used system, by using the equivalent binary values of the decimal digits from 0 to 9. Decimal values having multiple digits are represented by arranging these binary equivalents in a series. All other binary numbers are then available to represent letters of the alphabet, instruction codes, or special symbols. Any character which may be desired is assigned an individual combination of binary digits which represents that character in all computer functions. Six binary digits are normally sufficient to represent all desired combinations, since they provide 63 binary numbers, exclusive of zero. Computers may, therefore, use a six channel code employing a like number of parallel binary digits. Since characters can represent either numbers or letters, this code may be considered an alpha-numeric code. For convenience in manipulating information, the combinations which are applied to letters of the alphabet are normally kept in sequence.

In digital information handling systems using such a binary alpha-numeric code, it is frequently desired to compare and order two groups of combinations which may represent words or multi-digit numbers or characters. For example, words may be stored in random order, and it may be desired to order them into a predetermined sequence, such as a telpehone listing would contain. Or, numeric values may have to be ordered with the lowest number first.

To perform these functions a device should be capable of comparing not only two single blocks of information, but also two groups of blocks of information. A device employed in digital computing systems should specifically be capable of comparing blocks of information of either alphabetic or numeric significance, because, as will be explained later herein, the comparison rules for alphabetic information are not the same as those for numeric information. In the usual binary digital computing system the character-representing combinations of digits are handled in the order of their significance, most significant digit first. Thus a device for determining the order of precedence of blocks of information should preferably be capable of direct manipulation of information so presented.

One system for determining the order of precedence of two single blocks of information is shown in a copending application, Serial No. 376,714, entitled "Justification Device," filed August 26, 1953, by Linder C. Hobbs, now U.S. Patent 2,785,856, issued March 19, 1957, and assigned to the same assignee as the present invention. The above identified application shows and describes an arrangement for comparing blocks of information having variable lengths. The other systems of the prior art do not handle variable length blocks, but attempt to simplify the problem of comparison by using blocks of standard lengths, in which unused characters are indicated by a predetermined signal, such as zero. It will be appreciated that an information handling system accommodating variable length information blocks affords advantages over standard block length systems, such as a savings in the time of operation, as well as in the compactness with which such messages may be stored.

As an introduction to the general problem of determining the order of precedence of grouped blocks of information, consider two often encountered specific situations. One is the process of alphabetizing names, which essentially is the duplication of a telephone listing. The other situation is the placing of decimal numbers in numerical order. In normal English notation, the most significant characters of both alphabetic and numeric blocks of information are at the left. But for comparison purposes the most significant characters in these two types of blocks are not treated the same. In the alphabetizing process, for example, the most significant characters in a telephone listing are placed in the same column, at the left. In numerical ordering, however, the least significant characters in a series of decimal numbers are placed in the same column, on the right. Thus, with alphabetical characters the following arrangement usually is observed:

Woods, John A.
Woodson, John A.

while with numeric characters the arrangement usually is in this form:

9123
214567

Thus, for ordinary visual comparisons, the alphabetical characters are aligned with or "justified" to the left margin, wihle the numeric characters are aligned with or "justified" to the right margin.

With the devices of the prior art which store and utilize standard length information blocks, comparison problems are simplified by the coding methods used. All alphabetic characters are started from the left side, most significant digit first, and all numeric characters are started from the right side, least significant digit first. Single blocks in a ten character standard block system look as follows:

Jones+++++
++++++2436 where "+" indicates a special symbol denoting unused characters.

With this coding system, numerical magnitude determines the order of precedence, regardless of the type of characters involved.

As stated previously, however, this method of information coding is wasteful of time and space. Furthermore, it does not readily provide for comparing one group of blocks against another group or for comparing in systems which cannot easily use such coding methods. It is apparent that economy of time and space would be greatest if a comparison device could indicate the order of precedence of randomly variable multi-block groups. Considerable savings are still effected, however, where the groups have a standard number of characters, and the blocks within the groups are of variable lengths.

It is, therefore, an object of this invention to provide an improved means for justifying information during a comparison process.

Another object of this invention is to provide an electronic justification system having a rapid and reliable action.

It is another object of this invention to provide an improved and superior justifying system for comparing non-standard length items.

Yet another object of this invention is to provide a system for comparing multi-word blocks of information of standard or non-standard length.

It is a further object of this invention to provide a novel system for selectively comparing alphabetic or numeric messages.

Another object of this invention is the provision of a system superior to those in the prior art which can accurately compare two messages.

A further object of the invention is to provide a system for justifying right or left, as desired, non-standard length items for comparison of the items and the messages including the items.

These and other objects are achieved in the present invention by the use of an arrangement for storing the results of a character comparison and for recognizing the termination of a block of characters. The arrangement relates these two factors as they arrive from two blocks of information and provides an output indicative of the relative magnitude of the two blocks of information. If the two blocks are the same, the arrangement proceeds to compare the succeeding two blocks.

When two items are numerically compared, the most significant characters are compared first, and the first indication of inequality of characters is retained as a state of conduction in a bistable multivibrator or flip-flop. This retained intelligence is released if the one number thus indicated as larger is not the shorter of the two. If it is the shorter, the inequality is reversed and an output indicative that the one number is shorter, is provided, irrespective of the indication retained by the flip-flop. The result is a comparison with "justification right."

When alphabetic items are to be compared, the arrangement is such that the first inequality detected between the individual characters (compared most significant characters first) provides the indication of the relative magnitudes of the words. In this case, the relative lengths of the blocks control only if the words are otherwise equal in all the characters common to both. The result is a comparison with "justification left."

An equality signal can be provided in one of several ways, dependent on the conditions involved and the comparison desired. The characters of a standard length block can be counted until the standard length is reached, with equality indicated if no prior inequality of individual characters or length has first appeared. Two individual words can be compared, and equality indicated, if the individual characters and word lengths are both equal. Or multi-word blocks of information of variable length can be compared, and equality indicated, if the message terminates without a prior indication of inequality.

The novel features of this invention, as well as the invention itself, both as to its organization and method of operation will best be understood from the following description, when read in connection with the accompanying drawings, in which like reference numerals refer to like parts and in which.

*Definitions*

Figure 1:
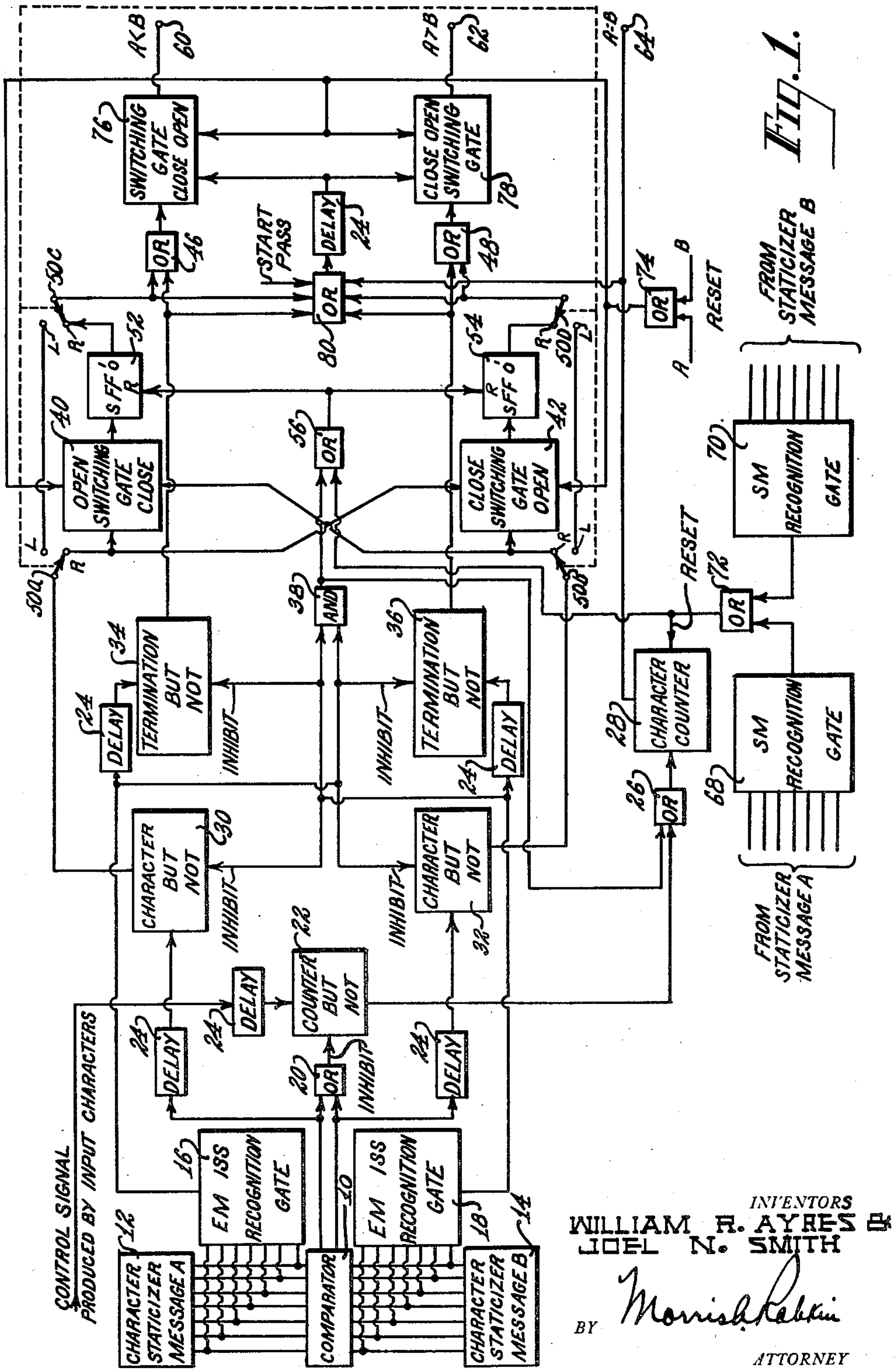
Figure 1 is a block diagram of one embodiment of the present invention which provides for justifying right or justifying left.

For the purposes of understanding the present invention the following definitions are provided.

A logical grouping of characters is an item, which may in turn be either an alphabetical word or a multi-digit decimal number. "Standard word length" includes both standard length alphabetic words and multi-digit numbers. A message is a sequential grouping of items which together form a logical whole. Therefore, what has previously been referred to herein as a block of characters is hereinafter an item, while what has previously been referred to as a group of blocks is hereinafter a message.

The process of comparing two messages, including single-item messages, to determine the order of the precedence, is herein termed "justification," following the notation adopted in the application by Hobbs, previously referred to. Messages are said to be justified "left" when the process employed conforms to the example of duplicating a telephone listing. Conversely, messages are said to be justified "right" when the process performed conforms to the example of ordering decimal numerical amounts.

As used herein, a first message, A, is composed of individual characters *a*. This message is to be compared to a second message B, composed of individual characters *b*, to determine whether the messages are equal ($A=B$), whether the first message is larger than the second ($A>B$), or whether the reverse is true ($A<B$).

*Requirements for a justifier*

For a justifying device to have application in properly indicating the order of precedence of information which may be of unequal lengths, it must make provision for the following conditions:

(A) Where numbers are compared in conventional fashion, (justifying right) the longer number must be shown as greater. (1234 is greater than 843). Inequality between corresponding characters controls only where the numbers are of equal length. (843 is greater than 123).

(B) Where alphabetic items are compared in conventional fashion (justifying left), the first disparity between corresponding characters determines the order of precedence of the items, regardless of length. (Doe is greater than, and listed after, Baker.) Relative length controls only where the characters common to both items are equal. (Woodson is longer than, and listed after, Woods.)

(C) When messages are to be compared, all items down to the least significant must be tested for equality if necessary. (Jones, John B. is greater than, and must be listed after, Jones, John A.)

*Environment of the justifier*

Any type of serial digital representation may be used, such as a pure binary system or a pure decimal system instead of the six channel binary coded system used for illustrative purposes herein. Since the items are composed of characters, provision is made for comparing the two most significant characters first, then the two next most significant characters and so forth until one character is found to be larger than the other. A first signal is provided which is indicative of one character being larger than the other and a second signal is provided which is indicative of the one character being smaller than the other.

To illustrate its operation, the invention is described herein in connection with a specific coding method, and data processing system, with which the invention coacts. In the preferred embodiment of Figure 1, the length of items within the messages may vary. Each item except the last terminates in an item separation symbol (ISS); the last item in a message terminates in an end message symbol (EM). These symbols are distinctive signal combinations, selected from one of the combinations available in the six channel code employed. Another distinctive signal combination denotes each character position for which no other symbol is needed in a message. The messages to be compared also include further distinctive signal combinations indicative of start message (SM) instructions, and of a start pass instruction. The data processing system includes selectively controllable devices for indicating the beginning and ending of message groupings, which indications are here termed system reset and close signals.

Although these signals are not fundamental to the operation of the device of the invention, they are included for the purpose of illustrating the device as an integrated unit. Such signals can originate in various well known ways, as part of the machine programming or from the stored information.

*Arrangement of the preferred embodiment*

Referring now to Figure 1, a comparator 10 is coupled to two character staticizers 12, 14, one for each message to be compared. The comparator 10 may be that more completely shown and described in co-pending patent application, Serial No. 321,697, filed by W. R. Ayres on November 20, 1952, and entitled "Comparing Systems," now U.S. Patent 2,844,309, issued July 22, 1958. The comparator 10 operates by first comparing the two highest order binary digits of one character with the two highest order digits of a second character. The comparator 10 converts the digital values to analogue voltages. These analogue voltages are applied to a differential amplifier which compares these voltages and provides a first output indicative of which is the larger. The same process is repeated, and second and third outputs are obtained, by individually comparing the two next lower order digits for the two characters, and the two lowest order digits for the two characters. The first and second outputs, properly weighed, are then compared to produce an intermediate output. The intermediate and third outputs, again properly weighed, are then compared, and the result of this last comparison indicates which of the two characters is the larger.

The staticizers 12, 14 are the means for registering information in the alpha-numeric code, and may be of the type shown in an article by A. D. Booth, entitled "The Physical Realization of an Electronic Digital Computer" in "Electronic Engineering" for December 1950, pages 492–498. As shown, the staticizers 12, 14 provide a six channel output, plus a seventh channel which supplies a parity, or checking, digit not of importance here. The outputs of the staticizers are also coupled to End Message and Item Separation Symbol recognition gates 16, 18. A recognition gate provides an output signal only on the existence of a specific pattern of input signals, such as an item separator symbol or an end message symbol. The item separation and end message recognition gates 16, 18 may be of the general type described in a patent entitled "Code Recognition System" issued to the present applicants as Patent No. 2,648,829 on August 11, 1953. Such a code recognizer can be set to recognize, for example, the occurrence in the input lines of all ones, whereupon an output is provided indicative of the occurrence. Broadly speaking, the code recognizer consists of a set of gates wherein one input is settable so that only the desired binary number provides the signals which are the required second inputs which open all the gates.

The two outputs of the comparator are coupled through a first "or" gate 20 to the "inhibit" input of a "but not" gate 22. An "or" or "mixer" gate, or buffer is a circuit of the type which provides an output signal on the existence of any one or more of a number of possible input signals. A "but not" gate is a circuit of the type which provides an output in response to an input signal only if a second input does not exist; the second input "inhibits" output, and an output indicates that there is a given first signal, *but not* a second.

The signal input of the "but not" gate 22 is coupled through a delay line 24 to a source of control signals indicative of the existence of input characters. The delay circuits herein may be of the type described in Chapter 22 of the book "Waveforms" by Chance et al., published by the McGraw-Hill Book Company. The output of this "but not" gate 22 which is hereafter termed the counter "but not" gate, is coupled through an "or" gate 26 to a predetermined character counter 28 as will be later described.

The outputs of the comparator 10 are also separately coupled through delay lines 24 to "but not" gates 30, 32 which are hereinafter referred to as character "but not" gates 30, 32. The outputs of the recognition gates 16, 18 are then separately connected through delay lines 24 to other "but not" gates 34, 36, these being referred to herein as termination "but not" gates 34, 36. These arrangements of delay lines and recognition and "but not" gates form two symmetrical channels, an $a>b$, and a $b>a$, channel. The recognition gate 16 for message A is grouped, for logical purposes, with the comparator output indicative of $a<b$ and the recognition gate 18 for message B is grouped with the comparator output indicative of $a>b$. The channels are cross-coupled by applying the output of the recognition gates 16, 18 in each channel to the inhibit inputs respectively of the other channel character "but not" gates 32, 30 and respectively to the other channel termination "but not" gates 36, 34. The outputs of both recognition gates 16, 18 are further coupled to the inputs of a single "and" gate 38 which may be termed a termination coincidence gate 38. "And" or coincidence gates are circuits which provide an output signal only on the coexistence of a predetermined number of input signals. Suitable "and" and "or" gates are described and shown in a book published by the McGraw-Hill Book Co., "High Speed Computing Devices" by Engineering Research Associates, and also in an article by Tung Chang Chen in "Proceedings of the IRE," May 1950, page 511, entitled "Diode Coincidence and Mixing Circuits in Digital Computers."

Figure 2:
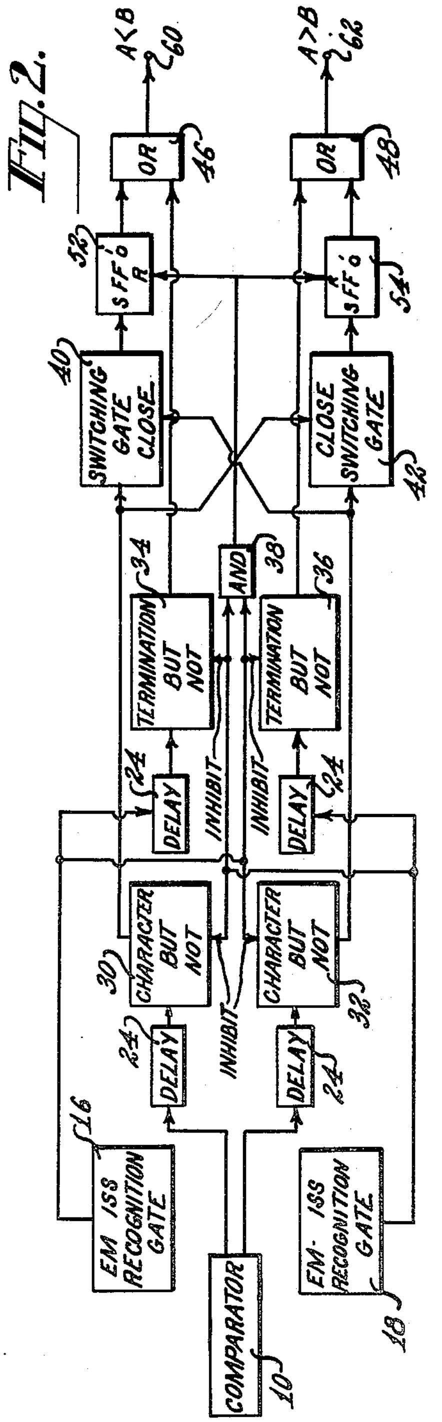
Figure 2 is a partial block diagram showing the arrangement of the embodiment of Figure 1 for determining inequality when justifying right and with certain connections of Figure 1, unnecessary for justifying right, omitted.

Each character "but not" gate 30, 32 is coupled respectively to one fixed terminal of sets of contacts 50a,

50*b* of a four-pole double-throw switch 50 having also sets of contacts 50*c* and 50*d*. With the four-pole switch 50 thrown, as shown, to the position R to justify right (see also Figure 2), each of the character "but not" gate 30, 32 outputs is applied along its channel respectively to the "signal" input of an associated switching gate 40 or 42. The "justify right" condition of the circuit is illustrated in Figure 2 with the switch 50 omitted for simplicity. The "justify left" switch 50 position will be described hereinafter.

From the switching gates 40 or 42 the character "but not" gate 30, 32 outputs are applied respectively to the set side of signal-retaining flip-flops 52 or 54 in the same channel. Thus each signal from the character "but not" gate 30 or 32 in a channel follows a gate controlled path to a signal-retaining flip-flop 52 or 54 in the same channel. However, each character "but not" gate 30, 32 output is applied respectively to the "close" input of the switching gate 42, 40 in the other channel. An "or" gate 56 couples the output of the termination coincidence gate 38 to the reset inputs of each signal-retaining flip-flop 52, 54.

The flip-flop circuits employed herein may be the well known Eccles-Jordan bistable state circuits, also known as triggers or as bistable multivibrators. These are also shown and described in Chapter 3 of "High Speed Computing Devices," supra. A flip-flop responds to a "set" input which establishes the flip-flop circuit in one stable state, and to a "reset" or "release" input, which establishes the flip-flop in its other stable state. The state to which a flip-flop circuit is driven by the release input can be designated as the "zero" condition and represented as a low D.-C. level. This low (or "zero") output is low compared to the other (or "one") output. Since the stable states are opposed conditions in which one flip-flop tube is conducting and the other is cut off, a high trigger pulse applied on the release input will provide a brief output signal and the flip-flop will then remain stable with a low level or zero output. The brief high output can thus be used, in a well known manner, as an indicating signal.

A switching gate performs the function of permitting an input signal to pass and provide an output only if it is in a proper one of two alternative conditions. As herein employed, these two conditions are "open" and "close" and are derived from the alternative states of conduction of a flip-flop of the type described above. These flip-flops control a gate of the Rossi type, well known in the art, which provides an output signal in response to an input signal only if a proper gate signal is first applied to it. In operation, an "open" signal on the flip-flop actuates the Rossi gate for subsequent production of an output pulse, but a later "close" signal disables the Rossi gate until another "open" signal is received.

When the switch 50 is thrown on the terminal designated R, the zero output of each signal-retaining flip-flop 52 or 54 is coupled respectively through one fixed terminal of the sets of contacts 50*c*, 50*d* to an output "or" gate 46 or 48 in the same channel. Terminals 60, 62 are coupled separately to each output "or" gate 46, 48 in an arrangement to be later described herein. The terminal showing $A<B$ is termed a first inequality terminal 60, and that showing $A>B$ is termed a second inequality terminal 62.

If it is desired to justify left, the four-pole double-throw switch 50 is closed on the terminal designated L. Coupling is then made directly between the character "but not" gates 30, 32 outputs and the output "or" gates 46, 48. The "justify left" condition of the circuit is also illustrated in Figure 3, with the switch 50 and circuitry not pertinent to "justify left" omitted for simplicity.

To indicate equality in the preferred embodiment, a predetermined character counter 28 is coupled to the outputs of both the counter "but not" gate 22 and the termination coincidence gate 38 through an "or" gate 26. Such predetermined counters produce an output signal on reaching a specified total of input impulses. They are shown and described, for example, by J. J. Wild in an article entitled "Predetermined Counters" in Electronics magazine, volume 20, No. 3, March 1947, pages 120–123. The output of the character counter 28 is coupled directly to an equality terminal 64. This arrangement for indicating equality has also been segregated and arranged as a separate figure in the drawings for simplicity in explanation. The arrangement is shown as Figure 4.

Figure 3:
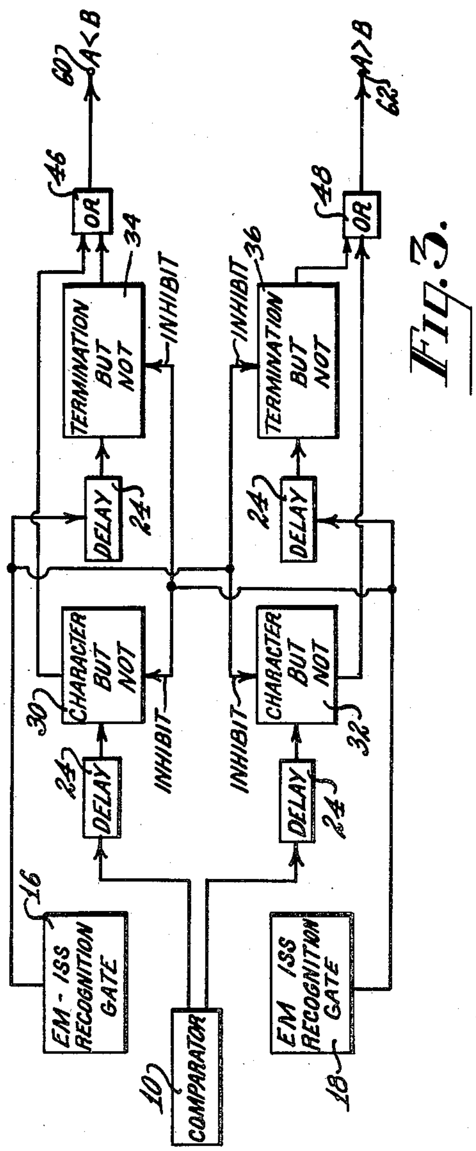
Figure 3 is a partial block diagram showing the arrangement of the embodiment of Figure 1 for determining inequality when justifying left, and with certain connections of Figure 1, unnecessary for justifying left, omitted.
Figure 4:
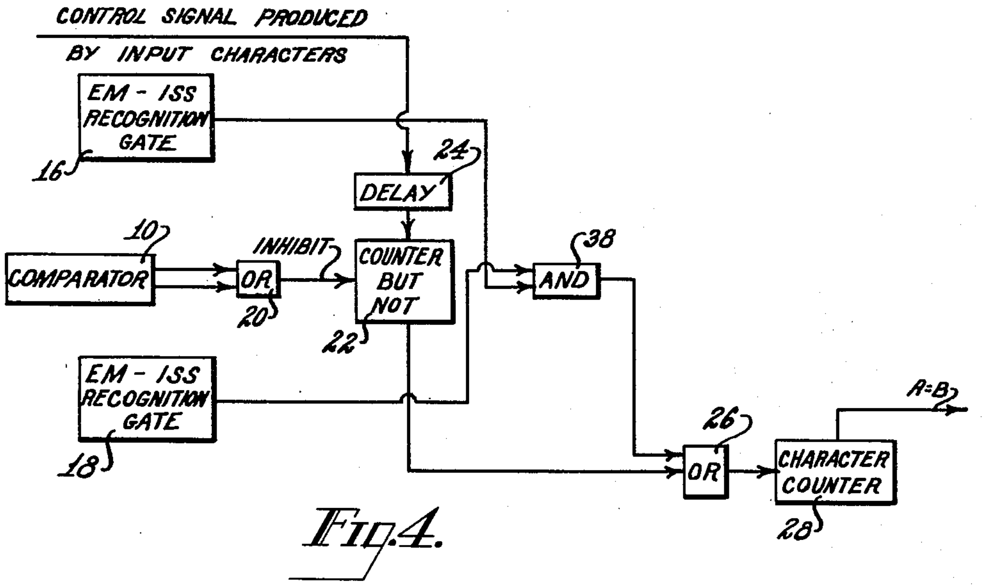
Figure 4 is a partial block diagram of the portion of the arrangement of Figure 1 which indicates when an equality exists.

The means by which the arrangement of the preferred embodiment of Figure 1 is reset and interacts with the overall system in which it is employed is not shown in the partial views of Figures 2, 3 or 4. Referring again to Figure 1, two recognition gates 68, 70 of the type previously referred to as embodied in Patent No. 2,648,-829 to the present applicants are employed. These code recognition gates 68, 70 are individually responsive to the signals from the character staticizers 12, 14 and produce an output on the occurrence of Start Message signals. The outputs of these gates 68, 70 are coupled through an "or" gate 72 to the reset input of the character counter 28, and also to the "or" gate 56 coupled to the reset inputs of the signal-retaining flip-flops 52, 54 of each channel.

The reset mechanism further includes a coupling from a system reset buffer 74 to the "open" input of each of the switching gates 40, 42. This buffer 74 is responsive to system signals which immediately precede the first pair of characters to be compared. The system reset buffer 74 is also coupled to each of two terminal switching gates 76, 78 which respectively complete circuits in each channel between the output "or" gates 46, 48 and the first and second inequality terminals 60, 62. Coupling to the close input of each of these terminal switching gates 76, 78 is made through a delay line 24 from a six input buffer 80. The buffer is responsive to a Start Pass signal, and is in circuit with the lead to the equality terminal 64 and the inputs to each of the output "or" gates 46, 48.

*Operation of the arrangement of Figure 1*

The operation of the arrangement above described may be analyzed in the light of four broad logical functions: Determining inequality when justifying right, determining inequality when justifying left, determining equality, and resetting for repeated operation. While Figure 1 contains the entire system, the relations of the parts pertinent to each of these logical functions have been segregated and illustrated in Figures 2, 3, 4 and 5.

*Determining inequality when justifying right*

Referring to Figure 2 as well as Figure 1, the signals representative of each of two messages are derived from two staticizers 12, 14 (showing in Figure 1 only). These signals are produced sequentially, with the most significant character first in the train, and with the first characters of the messages coexisting in time regardless of message length. Thus the associated comparator device 10 compares individual characters, or unit increments, in the order of their significance, producing an inequality indicative output, either $a>b$ or, $a<b$ if the characters are not the same, but not producing an output if the characters are equal. The two code recognition gates 16, 18, each of which is responsive to one of the staticizers 12, 14, produces individual signals representative of the termination of an item or a message.

Justification, whether right or left, requires proper recognition of these signals and a signification of the order of precedence between them. Justifying right may most easily be visualized, as stated above, as placing the right hand character of one item A' in the same column as the right hand character of a second item B'. The items usually are numbers, as:

A'=1546●
B'= 237●
(where ● is an Item Separation Symbol)

Item A', being longer, is greater and must be indicated as such even though the comparison of the most significant characters (1 of A' and 2 of B') shows an inequality.

To recognize inequality of length, as in the above example, and to properly indicate the relative magnitudes of two messages, the justifier must tentatively store the significant comparator output until either message has terminated. In accomplishing this tentative storage, the by-pass switches 50 must initially be turned to the position (or contact) designated R. Then when the most significant characters of each message are compared by the comparator 10, 2 is shown by an output signal to be greater than 1, that is, $b>a$. The signal so produced by the comparator, being the first introduced in the system, proceeds in the $b>a$ channel through a delay 24 and the character "but not" gate 30, a by-pass switch 50, and a switching gate 40 to the set side of a signal-retaining flip flop 52. Thus the flip-flop 52 is set to produce an output pulse on the arrival of a reset pulse at its reset input. The comparator 10 output signal also is directed to the "close" input of the other switching gate 42, to prevent its associated signal-retaining flip-flop 54 from operating during the same message comparison.

Accordingly, with one signal-retaining flip-flop 52 set and the switching gate 42 to the other flip-flop 54 closed, later comparator 10 outputs cannot produce a different state of signal retention in the symmetrical flip-flop arrangement. When the second most significant characters (for example, 5 of A' and 3 of B') are compared, an $a>b$ output is produced and directed through the system.

This $a>b$ output, however, is stopped in the $a>b$ channel at the associated switching gate 42, which is closed, although this $a>b$ output does provide a signal at the close input of the opposite switching gate 40. If the signal were $b>a$, the process would merely have been a repetition of that with the most significant characters. Had there been an equality in any or all of the comparisons, there simply would have been no signal available to affect the flip-flops 52, 54.

Thus the character comparisons are made sequentially, in the order of decreasing significance, and the first comparison which indicates the relative magnitudes of the two messages is retained for later use under proper circumstances. When the termination signals do not coincide, however, the signals so retained are not used. Instead, the first termination signal which arrives alone is used to provide an output which indicates that its message is the smaller. In the above example, where A' is 1546● and B' is 237●, the termination signal from B' arrives before that from A' when the reading of both numbers is started together. The prior termination of B' is recognized at the code recognition gate 18, which directs a signal through the $a>b$ channel from the delay 24 and termination "but not" gate 36 to the output "or" gate 48 and terminal switching gate 78 and then to the second inequality terminal 62. Thus the first recognized termination signal provides an output through one of the signal channels which by-passes the signal-retaining flip-flops 52, 54.

If the termination signals occur at the same time, however, they are utilized to derive an inequality indicative output from any signal retained at the flip-flops 52, 54. To derive the inequality output, the output signals produced when the code recognition gates 16, 18 recognize the termination of items are each directed through delay lines 24 to their associated termination "but not" gates 34 or 36. But prior to reaching the delay units 24 which are before the termination "but not" gates 34 and 36 the code recognition gate 16, 18 outputs also activate the inhibit input of the termination "but not" gate 34, 36 in the opposite channel. The delay unit 24 retards the signal pulse sufficiently to permit the inhibition of the signal pulse by a termination pulse from the other message. Since there is symmetrical cross-coupling two coexisting termination signals inhibit both termination "but not" gates 34, 36 before a signal can pass through. Both signals do, however, pass to the termination coincidence gate 38, and from there through the "or" gate 56 to the reset inputs of each signal-retaining flip-flop 52, 54. Consequently if either flip-flop 52, 54 is set it will produce an output pulse, which is then conducted to the coupled inequality terminal 60, 62 in the manner above stated.

When items proceed through to simultaneous termination without a prior indication of character inequality, there is no output from the termination "but not" gates 34, 36 because they are mutually inhibited. And the signal-retaining flip-flops 52, 54, which have not been set, do not provide an output when impulsed at their reset inputs. Therefore, the comparison continues with succeeding items until an inequality appears or the process is otherwise terminated.

*Determining inequality when justifying left*

When justifying left the device must operate with the same signal patterns as when justifying right. Comparator 10 and code recognition gate 16, 18 outputs must be manipulated to provide, for example, the equivalent of an alphabetical telephone listing. In this situation, when the most significant characters are compared first any character inequality is decisive of the message relationship, regardless of the message lengths. Thus Doe is greater than Baker even though Doe is shorter. Accordingly, referring to Figures 1 and 3, the signal-retaining flip-flops 52, 54 and their associated switching gates 40, 42 are not needed. These units are therefore by-passed by turning the by-pass switches to the positions designated L. An output from either side of the comparator 10 then passes through one of the delay units 24, and a character "but not" gate 30 or 32, successively, to an output "or" gate 46 or 48, a termination switching gate 76 or 78 and the appropriate inequality terminal 60 or 62.

If one item or message terminates before the other when justifying left, the first code recognition gate 16, 18 output from either message provides an inequality indicative output as in justifying right. This is of importance only where the messages are otherwise equal, since a prior character inequality would have produced a message inequality signal. An example of this situation is where message A is Woodson● and message B is Woods●. Message A in this case must be indicated to be greater than message B. The method by which this indication is accomplished is the same as when items are of unequal length when justifying right. That is, the recognized termination signal is provided at the inequality output terminal 60 or 62 by a signal channel consisting of a delay unit 24, a termination "but not" gate 34 or 36, an output "or" gate 46 or 48, and a termination switching gate 76 or 78. A special problem arises in this situation, however, because of the fact that the comparator 10 compares the termination signal of one message with the corresponding character of the other message. In the example given above the termination symbol of message B would be compared to the third "o" of Woodson, and a character comparison output would be provided. To prevent this output from giving an erroneous inequality indication, the code recognition gate 18 output is used to inhibit the character "but not" gate 30 in the opposing channel. Since the character comparison signal is delayed before it reaches the character "but not" gate 30, and the code recognition 18 output is not delayed, the termination signal inhibits any simultaneous comparator 10 output which would have a contrary effect. It is to be noted that a comparator 10 output on the same channel as the terminating signal has the same inequality significance as that terminating signal. Therefore, the comparator 10 output is not inhibited and, since the comparator 10 output is also delayed, produces an output from the character "but not" 32 substantially coinciding with that from the termination "but not" gate 36.

Where all characters are equal and terminating signals coincide, as in justifying right the arrangement continues comparisons through succeeding items.

*Determining equality*

The preferred embodiment of the invention is adapted to be used with a serial memory in which each message is allotted a predetermined maximum number of characters, and in which a "zero" is placed in each unused position following the least significant characters. Thus, referring to Figures 1 and 4, although the embodiment must continue comparisons until an inequality is found, no equality indication need be given until the predetermined character count is reached. Also, the numbers must be equal if the predetermined character count has been reached and neither prior inequality in characters nor termination signals have appeared. Therefore, by counting all equal characters, including termination signals and zeroes, an output is provided when and if the desired total is reached. The counting is done by a character counter 28 responsive to the control signal produced by the input characters. By delaying the control signal at a delay unit 24 and then passing it through a counter "but not" gate 22, the control signal can be blocked from the counter 28 by an inhibiting signal from the comparator 10 output. A character inequality indicated by the comparator 10 thus prevents the counter 28 from reaching the desired total in the fixed length messages being compared. As will be described later, the counter 28 is then reset before a new count is begun.

The counting of termination signals requires an added connection to the counter 28 input from the output of the termination coincidence gate 38. The control signal may be inhibited by a comparator 10 output if one item terminates in an End Message symbol while the other terminates in an Item Separator Symbol. With a fixed message length, however, the comparator 10 can determine whether there are further inequalities. Therefore, the output of the termination coincidence gate 38 also activates the counter 28. It does provide a superfluous input to the counter 28 when the terminating signals are alike, but this substantially coincides with the delayed control signal input to the counter 28 and does not produce an erroneous count.

The arrangement employed in the preferred embodiment for indicating equality may be modified to accommodate different operating conditions. As one example, it may be desired to compare only pairs of single items. In this case the items may be of different lengths, with each terminated by an Item Separation Symbol. As a second example, it may be desired to compare variable length messages having a fixed number of variable length items. A system for doing this may in one form entail added programming or circuitry to provide an indication that a message has been completed. Thus Item Separation Symbols may be inserted after the least significant item to make up the required number of items in a message, and detecting means, such as a counter which provides an output on reaching a predetermined count, may be used to indicate that the message has terminated. It is to be noted that the predetermined count need not be the same for succeeding pairs, or even for both messages of the same pair.

Figure 5:
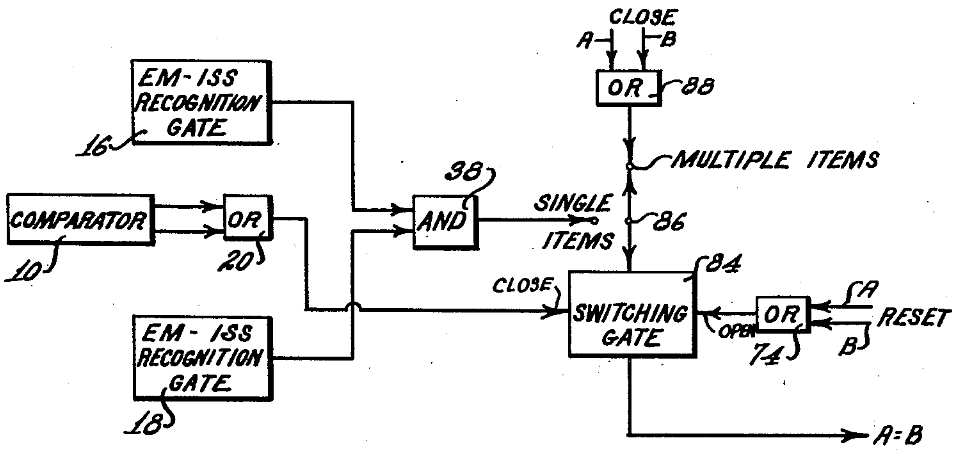
Figure 5 is a block diagram of an arrangement for determining equality which may be provided in addition to or in place of that in the embodiment of Figure 1.

One arrangement modified for these conditions is shown in Figure 5, and entails the addition or substitution of a switching gate 84, a selector switch 86 having single item and multiple item contacts, and a system close buffer 88. The open input of the switching gate is responsive to reset signals from either message through the connected system reset buffer 74, while the close input is connected to the comparator 10 outputs. The signal input of the switching gate 84 can be selectively coupled at the selector switch 86 to the output of the termination coincidence gate 38 or to a system close buffer 88 responsive to the system close signals.

Use of the single-item selector switch 86 contact will provide equality indications for one pair of variable length items only. When individual items are compared the system indicates any inequalities in the manner previously described. The items cannot be equal, however, unless the items are of equal length, so that the termination signals coincide. Therefore, equality is indicated by an output from the termination coincidence gate 38 when there has been no prior character inequality signal. Any character inequality causes the output of the comparator 10 to close the switching gate 84 to prevent an item equality indication. When items alone are compared no end message recognition is needed, so that only Item Separation Signal recognition gates 16, 18 are shown.

If it is desired to compare varaible length messages composed of variable length items, the selector switch 86 is turned to the multiple item contact and the output of the comparator 10 is used to close the switching gate 84. If there has been no previous inequality when a system close signal is received, that is, when either message is complete, the switching gate provides an equality output signal that $A=B$.

The system of Figure 5 operates correctly even where a message termination signal coincides with an item termination signal and there has been no prior character inequality. In this situation, the first character inequality would be between the termination signals. This circuit, however, would not provide a system inequality output at an inequality terminal because of the inhibiting effect of both termination signals. Since the comparator 10 detects the inequality between the different terminating signals, however, the comparator 10 provides an output which closes the switching gate 84, thus preventing an erroneous equality output on receipt of a subsequent system close signal. Further character inputs from the unfinished message then determine the true inequality signal.

Thus the modification of Figure 5 enables the comparison of pairs of single variable-length items, or of messages having a fixed number of variable-length items, while the device of the preferred embodiment compares messages having predetermined maximum character counts. It will be obvious to those skilled in the art that other operating conditions or environments may be selected and utilized with the invention.

*Reset and continued operation*

Following any justification a signal is produced indicative of the relative magnitudes of the two messages. Referring again to Figure 1, it may be seen that this signal is directed to the six input buffer 80 and then through a delay unit 24 to the close input of both termination switching gates 76, 78. Thus any system output signal blocks any further signals at the inequality terminals 60, 62.

At this point, however, the system is not ready to commence another justification process. The signal-retaining flip-flops 52, 54 must be put on the reset side, and all switching gates 40, 42; 76, 78, opened preparatory to further operation. Accordingly, when a Start Message signal from the system is recognized by the SM recognition gates 68, 70, it is employed to impulse both flip-flops 52, 54 at the reset side, and to reset the character counter 28 from whatever count it may have reached. Flip-flop 52, 54 outputs do not provide an erroneous indication because the termination switching gates 76, 78 are still closed. The subsequent arrival of a reset signal at the system reset buffer, 74, indicating that the system is to operate, then opens all the switching gates 40, 42; 76, 78. The system again operates until an output is produced, when the termination switching gates 76, 78 are again closed and the process is repeated.

*Delay and but not*

Figure 6:
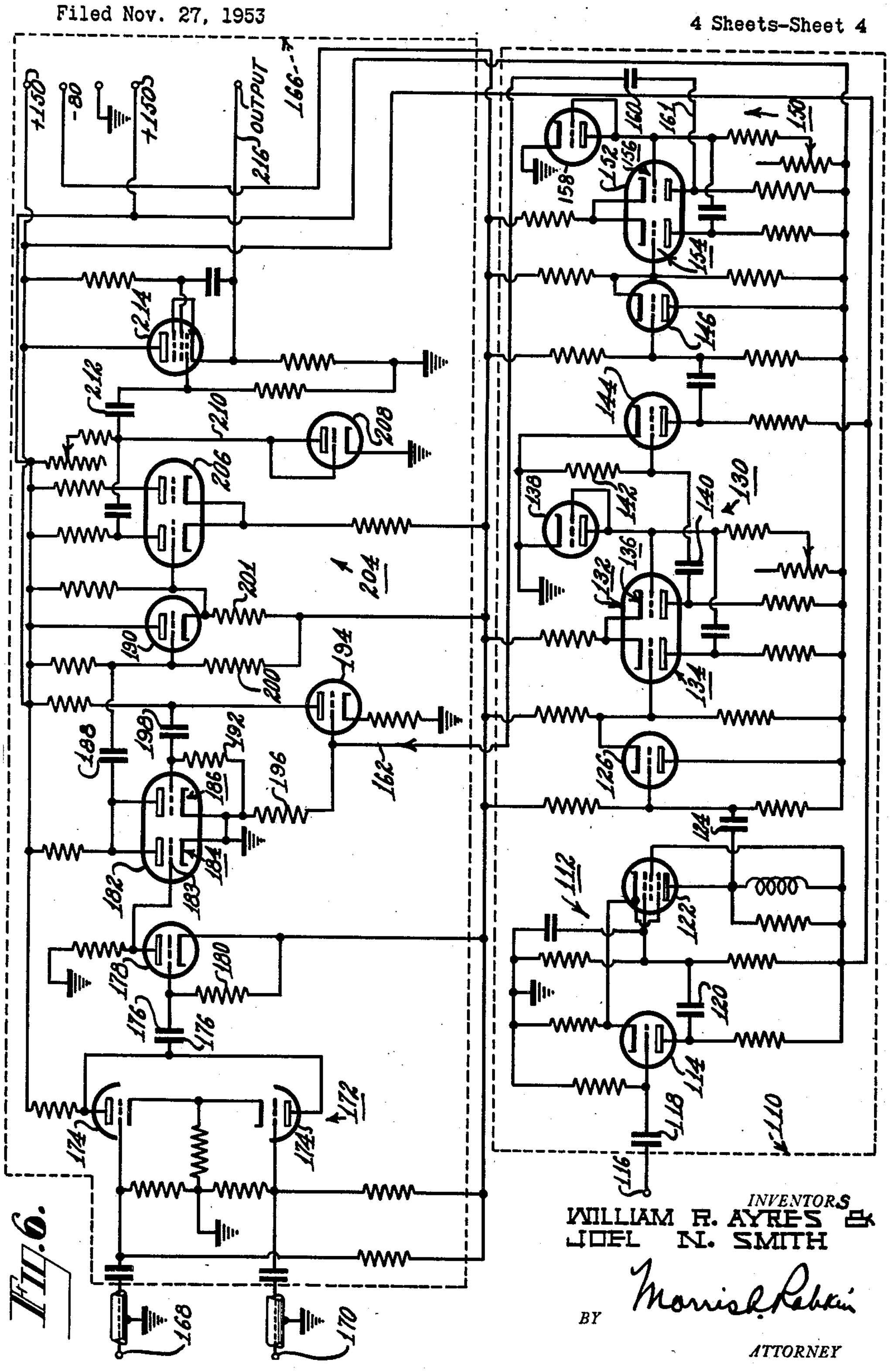
Figure 6 is a schematic view of a "delay and but not" circuit employed in an embodiment of the invention.

The "delay" and "but not" arrangements employed with the device of this invention perform separate logical functions, and thus have been shown as operating separately. While a "but not" gate is shown and described in the article by Chen cited above, the preferred embodiment of this invention employs a combined "delay and but not" having particular advantages. The combined "delay and but not" is shown in Figure 6, and utilizes an all-electron tube design for rapid and reliable coaction between the various input impulses. Further, the circuit of Figure 6 is stable over a wide range of operating characteristics and voltages, and is not affected by ordinary variations in input pulse shapes or pulse times. The "delay and but not" arrangement further includes an "or" gate responsive to either of two inhibiting impulses.

Referring to Figure 6, the structure of the "delay" unit 110 within this combined gate employs a pulse forming stage 112. In it a first inverter amplifier 114 is coupled to the signal input 116 through a capacitor 118. The anode of first inverter amplifier 114 is coupled through a capacitor 120 to the control grid of a pentode pulse former 122. The first inverter amplifier 114 cathode is coupled to the cathode of the pentode pulse former 122. The anode of the pentode pulse former 122 is in circuit with a capacitor 124 and the control grid of a first cathode follower 126 which is normally held cut off.

Proper delay and shaping of the signal pulse from the pulse forming stage 112 by two one-shot multivibrator stages 130, 150 disposed in tandem. The first stage 130 uses a first dual triode 132, the control grid of the left side 134 of which is coupled to the cathode of the first cathode follower 126. The cathodes of both sides 134, 136 of the dual triode 132 are coupled together. The control grid of the right side 136 of the dual triode 132 is in circuit with the anode of a diode-connected clamping triode 138 which clamps the control grid at ground. The right side 136 anode is in circuit with a capacitor 140, a resistor 142, and the control grid of a second inverter amplifier 144. The first clamping triode 138 and the first dual triode 132 together form a one-shot multivibrator 130. The operation of such a multi-vibrator is well known in the art, as producing a unidirectional pulse of a predetermined duration in response to a triggering pulse. The second inverter amplifier 144 is normally held at zero bias, and its anode is connected to the control grid of a second cathode follower 146, which forms the input to the second one-shot multivibrator stage 150.

The second cathode follower 146 is normally held cut off, and couplings are made between it, a second dual triode 152, and a second clamping triode 158 as in the corresponding elements in the first one-shot multivibrator stage 130. The final output coupling 161 of this delay unit 110 is taken off the anode of the right hand side 156 of the second one-shot multivibrator 150, and coupled through a capacitor 160 to the signal input 162 of the "but not" unit 166.

In the "but not" unit 166 each of two inhibit inputs 168, 170 is connected to the control grid of each of two triode halves 174 of a buffer stage 172. The cathodes of the triode halves 174 are coupled together. Each triode half 174 anode is in circuit with a single capacitor 176 and the control grid of a third inverter amplifier 178 which is normally conducting. The cathode and the control grid of the third inverter amplifier 178 are coupled together through a resistor 180, and the anode is coupled to the inhibit input 183 of a dual gating tube 182. The dual gating tube 182 consists of two triodes 184, 186, the left hand side 184 constituting the inhibit stage, and the control grid of the left hand side constituting the inhibit input 183 to which the third inverter amplifier 178 is coupled.

The right hand side 186, or signal stage anode of the dual gating tube 182 is coupled through a capacitor 188 to the control grid of a third cathode follower 190. The third cathode follower 190 control grid is connected through two resistors 200, 201 to the cathode. An input inverter amplifier 194 is coupled at its grid to the output lead 161 from the "delay" unit 110. The input inverter amplifier 194 grid is coupled through a resistor 196 to the cathodes of the dual gating tube 182. The input inverter amplifier 194 anode is coupled through a capacitor 198 to the control grid of the right hand side 186 of the dual gating tube 182. The third cathode follower 190 is normally held cut off such that it is unaffected unless both halves 184, 186 of the dual gating tube 182 are non-conducting.

The output of the third cathode follower 190 is directed to a third one-shot multivibrator stage 204 which forms the final output pulse. The third one-shot multivibrator stage 204 consists of a third dual triode 206 and a third clamping triode 208 arranged and coupled as in the preceding two multivibrator stages 130, 150. The output lead 210 of this third stage 204 is coupled through a capacitor 212 to the control grid of an output cathode follower pentode 214, to the cathode of which the system output lead 216 is coupled.

In operation, the "delay and but not" arrangement is subject to substantially simultaneous inhibiting and signal impulses which it must properly relate. An inhibit pulse can be applied to either or both inhibit inputs 168, 170. In either case, the signal impulse should be delayed and cut off when an inhibit impulse co-exists with the signal impulse.

A positive signal pulse directed from the signal input 116 to the grid of the first inverter amplifier 114 causes a drop in the anode potential of that tube, and consequently a drop in the potential of the grid of the pentode pulse former 122. Thus the potential of the pentode 122 anode rises, but the pulse delivered from the first pulse forming stage 112 is a large positive signal followed by a smaller negative signal. The succeeding first cathode follower 126, to which these signals are applied, is normally cut off and is affected only by the positive signal. This causes a positive voltage spike to appear at the first cathode follower cathode and then at the control grid of the left hand side 134 of the first one-shot multivibrator 130.

In response to this voltage spike the first one-shot multivibrator 130 produces a positive pulse of fixed duration at the anode of the right hand side 136 of the first dual triode 132. This positive pulse is differentiated by the network created by the coupled resistor 142 and capacitor 140. The leading edge of the pulse appears as a positive spike whose amplitude is limited due to the clamping action of triode 144. The trailing edge of the pulse is converted to a negative spike, and this appears at the control grid of the second inverter amplifier 144. The voltage variations at the grid of the second inverter amplifier 144 thus are a small positive spike followed by a larger negative spike, both of which are inverted and passed to the grid of the second cathode follower 146. The second cathode follower, 146, being normally cut off, effectively suppresses the small negative spike but passes the positive one to the second one-shot multivibrator stage 150. There, as in the first multivibrator stage, 130, a positive output pulse of a predetermined duration is produced at the anode of the right hand side 156 of the dual triode 152.

Thus the pulse applied at terminal 116, successively delayed by the pulse forming stage 112 and the two multivibrator stages, 130, 150, is the signal pulse which is directed to the "but not" stage.

A positive inhibit signal at the grid of either of the two normally non-conducting triodes 174 of the buffer stage 172 causes the triode 174 to which the signal is applied to conduct, and lowers the potential of its anode. This lowered anode potential causes a negative pulse at the grid of the third inverter amplifier, 178, which is normally conducting. Normally, also, the left hand side 184 of the dual gating tube 182 is held cut off while the right hand side 186 is conducting. The third inverter amplifier 178 becomes non-conducting due to the applied negative control pulse, and applies a positive pulse to the succeeding inhibit stage 184. The inhibit stage 184 is thus made conductive during the pulse. This conduction holds the anodes of both sides 184, 186 of the dual gating tube 182 at a low potential to cut off cathode follower 190 even though the right hand side 186 is non-conducting because of a signal pulse from the delay unit 110.

The result, therefore, is that with an inhibit signal on the left hand side 184 of the dual gating stage, the succeeding cathode follower 190 remains cut off despite a small rise in anode potential of the dual gating stage. The increased potential is due to the fact that a positive signal from the "delay" stage 110 is inverted and used to cut off the normally conducting right side 186 of the dual gating tube 182. However, as stated previously, conduction in the left side 184 sufficiently lowers the common anode lead to prevent more than a small excursion in the potential of the grid of the third cathode follower 190.

When an inhibit signal is not present, a signal pulse applied to the right hand side 186 of the dual gating tube 182 causes the third cathode follower 190 to conduct for a period equal to the pulse duration of the second one-shot multivibrator 150 output. In this case, the third cathode follower 190 output pulse is shaped in the third, or pulse shaping, multivibrator stage 204, so that the signal at the cathode of the output cathode follower 214 is a positive pulse of fixed duration.

This delay and "but not" unit thus delays the signal pulse, placing it safely within the inhibiting operation of an inhibit pulse. By this means both pulses may initially coincide in time, or the signal pulse may even slightly precede the inhibit pulse, without disturbing the reliable operation of the logical unit. By this means also degradations in wave form introduced elsewhere in the system are overcome and a shaped output signal is provided. The delay and "but not" unit thus has an overall function in coordinating and shaping signals in the system in which it is employed, and minimizes the need for certain compensating devices normally employed.

*Summary*

Although a complete system has been shown for illustrative purposes, it will be evident that the features of the device of the present invention are of general application. This arrangement may be employed with various circuits as long as there is a means of comparing individual characters and a means for providing significant termination signals. Specifically, within this framework, the character representations may be serial instead of parallel, or decimal instead of binary, and the reset indicia may assume any logical pattern.

For a justification to be carried out, the by-pass switches are set at the desired position, and an appropriate equality determining arrangement employed for the message patterns to be compared. The arrangement described will then prepare for starting, produce a message comparison output, and automatically repeat the procedure for as many message comparisons as may be desired.

Thus there has been described a novel justifier or message comparator for providing, at high speed, indications of the order of precedence of messages composed of variable length items. The device is stable, accurate, and adapted to perform a wide variety of logical functions.

What is claimed is:

1. A system for comparing signals representing first and second messages comprising means for comparing characters of said messages for order; means responsive to said signals for detecting and signalling the termination of groups of said characters within said messages; circuit means coupled to said comparing means and to said detecting means for signalling the sense of order inequality of said messages; means coupled to said circuit means for signalling equality of said messages when no inequality exists in said messages; and means coupled to said circuit means for preventing the signalling of equality of groups within said messages.

2. A system for determining the order of precedence of two messages, each said message comprising items, and each item including a train of characters represented by signals, said system comprising means for providing outputs responsive to the order of precedence of the individual characters of said messages, means receiving said trains of character signals for providing outputs responsive to the termination of said items within said messages, and means responsive to said outputs of both said means for signalling equality of said messages and preventing signalling of equality of individual ones of said groups.

3. In a system for determining the order of precedence of two messages, each said message comprising items, each item including a train of signals representing characters, said items and messages having distinctive terminating signals and said system including a comparator for providing outputs responsive to the sense of inequality of individual characters of said messages, a justifying device comprising means for detecting said terminating signals and providing outputs responsive to the sense of inequality of said signals, selective means to retain the first comparator output, means coupled to said retaining means and responsive to a coincidence of said terminating signals to release outputs retained by said selective means, means responsive to said terminating signals to inhibit comparator outputs and detecting means outputs corresponding to a sense of inequality opposite to that detected by said detecting means, terminal means the existence of signals upon which signify the sense of message inequality, said terminal means being responsive to said detecting means outputs, switching means selectively coupling said terminal means to said comparator outputs and to said retaining means, and means coupled to said terminal means and responsive to said messages to provide an equality signal when no prior inequality exists and preselected conditions have been met.

4. The invention as set forth in claim 3, wherein said means for providing an equality signal includes means coupled to the terminal means and responsive to the message character trains for providing a message equality signal on the occurrence of a predetermined number of characters without a prior inequality signal.

5. The invention as set forth in claim 3, wherein said means for providing an equality signal includes means coupled to said terminal means and responsive to a coincidence in terminating signals for providing an equality signal on the coincidence of said terminating signals without a prior inequality signal on said terminals.

6. In a system for determining the order of precedence of two messages, each said message comprising items, each item including a train of signals representing characters, said items and messages having distinctive terminating signals and said system including a comparator for providing outputs responsive to the sense of inequality of individual characters of said messages, a justifying device comprising means for detecting said terminating signals and providing outputs responsive to the sense of inequality of said signals, selective means to retain the first comparator output, means coupled to said retaining means and responsive to a coincidence of said terminating signals to release outputs retained by said selective means, means responsive to said terminating signals to inhibit comparator outputs and detecting means outputs corresponding to a sense of inequality opposite to that detected by said detecting means, terminal means the existence of signals upon which signify the sense of message inequality, said terminal means being responsive to said detecting means outputs, switching means selectively coupling said terminal means to said comparator outputs and to said retaining means, means coupled to said terminal means and responsive to said message character trains for providing a message equality signal on the occurrence of a predetermined number of characters without a prior inequality, means coupled to said terminal means and to said means for providing a message equality signal for blocking message inequality signals from said terminal means after a first signal of the relationship of the messages has been given, and means coupled to said retaining means, said means for providing a message equality signal, and said blocking means for setting said system in a starting condition.

7. In a system for determining the order of precedence of two messages, each said message comprising items, each item including a train of signals representing characters, said items having distinctive item separation signals and said messages having distinctive terminating signals and said system including a comparator for providing outputs responsive to the sense of inequality of individual characters of said messages, a justifying device comprising means for detecting said distinctive signals and providing outputs responsive to the sense of inequality of said signals, selective means to retain the first comparator output, means coupled to said retaining means and responsive to a coincidence of said terminating signals to release outputs retained by said selective means, means responsive to said distinctive signals to inhibit comparator outputs and detecting means outputs corresponding to a sense of inequality opposite to that detected by said detecting means, terminal means the existence of signals upon which signify the sense of message inequality, said terminal means being responsive to said detecting means outputs, switching means selectively coupling said terminal means to said comparator outputs and to said retaining means, means coupled to said retaining means and responsive to a preselected number of said terminating signals of said messages for resetting said system to a starting condition, and means responsive to said comparator outputs and to said means for resetting said system for providing an equality output signal when said system is reset without a prior character inequality signal.

8. In a system for determining the order of precedence of two messages, each said message comprising items, each item including a train of characters represented by signals, said items and messages having distinctive terminating signals and said system including a comparator for providing outputs responsive to the sense of inequality of individual characters of said messages, a device for justifying right comprising means for detecting terminating signals and providing outputs responsive to the sense of inequality of said signals, means to retain the first comparator output, means coupled to said retaining means and responsive to a coincidence of said terminating signals to release comparator outputs retained by said retaining means, means responsive to said terminating signals to inhibit comparator outputs and detecting means outputs corresponding to a sense of inequality opposite to that detected by said detecting means, terminal means the existence of signals upon which signify the sense of message inequality, said terminal means being coupled to said retaining means and responsive to said detecting means outputs, and means coupled to said terminal means and responsive to said messages, to provide an equality signal when no prior inequality exists and preselected conditions have been met.

9. In a system for determining the order of precedence of two messages, each said message comprising items, each item including a train of signals representing characters, said items and messages having distinctive terminating signals and said system including a comparator for providing outputs responsive to the sense of inequality of individual characters of said messages, a device for justifying left comprising means for detecting terminating signals and providing outputs responsive to the sense of inequality of said signals, means responsive to said terminating signals to inhibit comparator outputs and detecting means outputs corresponding to a sense of inequality opposite to that detected by said detecting means, terminal means the existence of signals upon which signify the sense of message inequality, said terminal means being responsive to said detecting means outputs and said comparator outputs, and means coupled to said terminal means and responsive to said messages to provide an equality signal when no prior inequality exists and preselected conditions have been met.

10. In a system for determining the order of precedence of a message A and a message B, said messages being arranged in trains of signals representing characters, $a$ and $b$ respectively, and disposed in items, said items and said messages having distinctive terminating character signals, said system including a device for comparing characters and indicating $a<b$ and $a>b$ as individual outputs, a justification system comprising means to detect terminating signal combinations in A and B and to provide individual outputs in response thereto, means to gate $a<b$ and $a>b$ comparison outputs, means to gate A and B terminating signal outputs, means selectively coupled to said comparison gate means to retain the first character comparison output, said $a<b$ comparison gate means and said A terminating signal gate means which are closed in response to a co-existing B terminating signal output, said $a<b$ comparison gate means and said B terminating signal gate means which are closed in response to a coexisting A terminating signal output, means responsive to a coincidence in A and B terminating signal outputs to release outputs at said retaining means, and $A<B$ terminal coupled to said A terminating signal gate means, and selectively coupled to said retaining means and $a<b$ comparison gate means, an $A>B$ terminal coupled to said B terminating signal gate means, and selectively coupled to said retaining means and $a>b$ comparison gate means, an $A=B$ terminal, and means for producing a count indicative of the number of $a$ and corresponding $b$ character signals and terminating signals which are equal and responsive to said output releasing means for providing a signal on said $A=B$ terminal in the absence of a prior inequality output.

11. The invention as set forth in claim 7, wherein said means to gate said terminating signal outputs and said character comparison outputs are "but not" gates.

12. The invention as set forth in claim 7, wherein said means to retain the first character comparison output include $a<b$ and an $a>b$ switching gates, and $a<b$ and $a>b$ signal-retaining flip-flops.

13. In a system for determining the order of precedence of a message A and a message B, said messages being arranged in trains of signals representing characters, $a$ and $b$, respectively, and disposed in items, said items and said messages having distinctive terminating signal combinations, said system including a device for comparing characters and indicating $a<b$, and $a>b$ as individual outputs, a justification system comprising means to detect terminating signal combinations in A and B and to provide individual outputs in response thereto, means to gate $a<b$ and $a>b$ comparison outputs, means to gate A and B terminating signal outputs, means selectively coupled to said comparison gate means to retain the first character comparison output, said $a<b$ comparison gate means and said A terminating signal gate means being closed in response to a co-existing B terminating signal output, said $a>b$ comparison gate means and said B terminating signal gate means being closed in response to a coexisting A terminating signal output, means responsive to a coincidence in A and B terminating signal outputs to release outputs at said retaining means, and $A<B$ terminal coupled to said A terminating signal gate means, and selectively coupled to said retaining means and $a<b$ comparison gate means, an $A>B$ terminal coupled to said B terminating signal gate means, and selectively coupled to said retaining means and $a>b$ comparison gate means, an $A=B$ terminal, means coupled to said $A<B$ and $A>B$ terminals and responsive to said message character trains for providing a message equality output on the occurrence of a predetermined number of characters without a prior inequality, swiching gate means coupled to said $A<B$ and $A>B$ terminals and said means for providing a message equality output for blocking message inequality and to which means is coupled said $A=B$ terminal signals from said terminal means after a first signal indicative of the relationship of the messages has been given, and means coupled to said means to retain the first character comparison output, said means for providing a message equality output, and said switching gate means for setting said system in a starting condition.

14. In a system for determining the order of precedence of first and second messages, each message consisting of trains of character signals arranged in items having distinctive terminating signals, said system including a character comparator providing a first output responsive to a first message character being less than a second message character, and a second output responsive to a first message character being greater than a second message character, a system for selectively justifying right and left comprising first and second inequality channels, said first and second channels comprising individual code recognition gates providing an output on the occurrence of a terminating signal in said first and second messages respectively, individual character "but not" gates having a signal input and output and an inhibit input, the signal inputs of said character "but not" gates being individually responsive to said first and second comparator outputs respectively, individual termination "but not" gates having a signal input and output and an inhibit input, the signal inputs of said termination "but not" gates being individually responsive to the code recognition gate outputs, the inhibit inputs of each of said "but not" gates in each of said channels being responsive to the code recognition gate in the other of said channels, individual switching gates each having a signal input, an open input, a close input, and an output, means to detect a coincidence in the outputs of said code recognition gates, individual signal-retaining flip-flops having a set condition responsive to an output from the switching gate in the same channel, said flip-flops changing from said set condition to a reset condition and providing an output in response to said coincidence detecting means, individual means selectively coupling the character "but not" output in each channel to the signal input of the switching gate in the same channel and the close input of the switching gate in the opposite channel, whereby a signal responsive to the order of precedence of said first and second messages is provided in one of said channels from the output of a termination "but not" gate or, selectively, a character "but not" gate or signal-retaining flip-flop, and means responsive to said order of precedence signals and said coincidence detecting means for providing an equality signal in the absence of an inequality when a desired number of characters have been compared.

15. In a system for determining the order of precedence of first and second messages, each message consisting of trains of character signals arranged in items, said character signals including distinctive terminating signals, said system including a character comparator providing a first output responsive to a first message character being less than a second message character, and a second output responsive to a first message character being greater than a second message character, a system for selectively justifying right and left comprising first and second inequality channels, said first and second channels comprising individual means to detect and provide output signals responsive to terminating signals in said first and second messages respectively, individual character comparison signal inhibiting means coupled to said first and second comparator outputs respectively, individual means to selectively retain a signal from said character comparison signal inhibiting means, individual terminal signal inhibiting means coupled to said detecting means, individual terminal means coupled to said terminal signal inhibiting means, switching means selectively coupling said terminal means and said retaining means, and additionally selectively coupling said terminal means and said character comparison signal inhibiting means, the terminal signal inhibiting means and character comparison signal inhibiting means in each of said channels operating inhibitively in response to an output from the detecting means in the other of said channels, said retaining means in each of said channels being inoperative in response to a signal from the character comparison signal inhibiting means in the other of said channels, and said system also comprising means responsive to the outputs of the detecting means in both channels for providing a signal for activating said signal-retaining means on a conicidence of said terminating signals, and counting means coupled to said first and second channels and responsive to said trains of characters for providing an equality output on the occurrence of a preselected number of said actuating signals in the absence of a prior inequality signal in said first and second channels.

16. The invention as claimed in claim 15, wherein said means for providing an equality output includes a predeterminal counter.

17. The invention as claimed in claim 15, said justifying system including, additionally, means coupled to said signal-retaining means for resetting said system to a starting condition, and wherein said means for providing an equality output includes means responsive to said character comparator and to said resetting means for providing a signal when said system is reset without a prior character comparator output.

18. In a system for determining the order of precedence of first and second messages, each message consisting of trains of character signals arranged in items, said character signals including distinctive terminating signals, said system including a character comparator providing a first output responsive to a first message character being less than a second message character, and a second output responsive to a first message character being greater than a second message character, a system for selectively justifying right and left comprising first and second inequality channels, said first and second channels comprising individual means to detect and provide output signals responsive to terminating signals in said first and second messages respectively, individual character comparison signal inhibiting means coupled to said first and second comparator outputs respectively, individual means to selectively retain a signal from said character comparison signal inhibiting means, individual terminal signal inhibiting means coupled to said detecting means, individual terminal means coupled to said terminal signal inhibiting means, switching means selectively coupling said terminal means and said retaining means, and additionally selectively coupling said terminal means and said character comparison signal inhibiting means, the terminal signal inhibiting means and character comparison signal inhibiting means in each of said channels operating inhibitively in response to an output from the detecting means in the other of said channels, said retaining means in each of said channels being inoperative in response to a signal from the character comparison signal inhibiting means in the other of said channels, and said system also comprising means responsive to the outputs of the detecting means in both channels for providing a signal for activating said signal retaining means on a coincidence of said terminating signals, means coupled to said signal retaining means for resetting said system to a starting condition, counting means coupled to said first and second channels and resettable by said resetting means and responsive to said trains of characters for providing an equality output on the occurrence of a predetermined number of said activating signals in the absence of a prior inequality signal in said first and second channels, and means coupled to said first and second channels and responsive to said equality output for closing said channels after a first signal of the order of precedence of the messages has occurred.

19. In a system for determining the order of precedence of first and second messages, each message consisting of trains of character signals arranged in items, said character signals including distinctive terminating signals, said system including a character comparator providing a first output responsive to a first message character being less than a second message character, and a second output responsive to a first message character being greater than a second message character, a system for justifying right comprising first and second inequality channels, said first and second channels comprising individual means to detect and provide output signals responsive to terminating signals in said first and second messages respectively, individual character comparison signal inhibiting means coupled to said first and second comparator outputs respectively, individual means to selectively retain a signal from said character comparison signal inhibiting means, individual terminal signal inhibiting means coupled to said detecting means, individual terminal means coupled to said terminal signal inhibiting means and said retaining means, the terminal signal inhibiting means and character comparison signal inhibiting means in each of said channels operating inhibitively in response to an output from the detecting means in the other of said channels, said retaining means in each of said channels being inoperative in response to a signal from the character comparison signal inhibiting means in the other of said channels, and said system also comprising means responsive to the outputs of the detecting means in both channels for providing a signal for activating said signal retaining means on a coincidence of said terminating signals, and counting means coupled to said first and second channels and responsive to said trains of characters for providing an equality output on the occurrence of a preselected number of said activating signals in the absence of a prior inequality signal in said first and second channels.

20. In a system for determining the order of precedence of first and second messages, each message consisting of trains of character signals arranged in items having distinctive terminating signals, said system including a character comparator providing a first output responsive to a first message character being less than a second message character, and a second output responsive to a first message character being greater than a second message character, a system for justifying left comprising first and second inequality channels, said first and second channels comprising individual means to detect and provide output signals responsive to terminating signals in said first and second messages respectively, individual character comparison signal inhibiting means coupled to said first and second comparator outputs respectively, individual terminal signal inhibiting means coupled to said detecting means, individual terminal means coupled to said terminal signal inhibiting means and said comparison signal inhibiting means, the terminal signal inhibiting means and character comparison signal inhibiting means in each of said channels operating inhibitively in response to an output from the detecting means in the other of said channels, and counting means coupled to said first and second channels and responsive to said trains of characters for providing an equality output on the occurrence of a preselected number of signals in the absence of a prior inequality signal in said first and second channels.

21. In a system for comparing two messages each of which includes items made up of signals representing characters, in combination, comparator means for comparing corresponding items of each message, character signal by character signal, for producing an inequality signal when two compared characters are unequal; means responsive to said comparator means for producing an equality signal indicating equality of said messages when all characters compared are equal; and means responsive to said comparison means for preventing an inequality signal from being produced only in response to equality of individual items.

22. In a system for comparing two messages each of which includes items made up of signals representing characters, in combination, comparator means for comparing corresponding items of each message, character signal by character signal, for producing an inequality signal when two compared characters are unequal; means responsive to said comparator means for producing an equality signal indicating equality of said messages when all characters compared are equal, said means including a counter for producing a count indicative of the character signals compared in each message which are equal; and means for preventing an item equality signal from being produced only in response to equality of individual items.

23. In a system for comparing messages in which each message includes items made up of signals representing characters, in combination, comparator means for comparing the messages, character signal by character signal, for producing an output signal in response to each character inequality; a counter for counting control signals indicative of each character compared; and means in circuit with said counter and responsive to each output signal for preventing the count of a character when there is inequality between item characters.

24. In a system for comparing messages in which each message includes items made up of signals representing characters, the items being separated by signals indicative of item termination characters and the messages being separated by signals indicative of message termination characters, in combination, comparator means for comparing the messages, character signal by character signal, for producing an output signal in response to each character inequality; a counter for counting control signals indicative of each character compared; means in circuit with said counter and responsive to each output signal for preventing the count of a character when there is character inequality; and means responsive to the comparison of an item termination signal with a message termination signal for applying a signal to be counted to said counter.

References Cited in the file of this patent

UNITED STATES PATENTS

| | | |
|---|---|---|
| 2,539,043 | Verneaux | Jan. 23, 1951 |
| 2,580,768 | Hamilton | Jan. 1, 1952 |
| 2,632,104 | Lakatos | Mar. 17, 1953 |
| 2,660,372 | Leclerc | Nov. 24, 1953 |
| 2,675,539 | McGuigan | Apr. 13, 1954 |
| 2,679,636 | Hillyer | May 25, 1954 |
| 2,688,695 | Odell | Sept. 7, 1954 |
| 2,785,856 | Hobbs | Mar. 19, 1957 |
| 2,797,862 | Andrews et al. | July 2, 1957 |

FOREIGN PATENTS

| | | |
|---|---|---|
| 1,005,754 | France | Jan. 2, 1952 |